US010498627B2

(12) United States Patent
Wang et al.

(10) Patent No.: US 10,498,627 B2
(45) Date of Patent: Dec. 3, 2019

(54) DETECTING PACKET FORWARDING PATH

(71) Applicant: Hangzhou DPtech Technologies Co., Ltd., Zhejiang Province (CN)

(72) Inventors: Chao Wang, Zhejiang Province (CN); Xinda Wang, Zhejiang Province (CN)

(73) Assignee: HANGZHOU DPTECH TECHNOLOGIES CO., LTD., Hangzhou (CN)

( * ) Notice: Subject to any disclaimer, the term of this patent is extended or adjusted under 35 U.S.C. 154(b) by 66 days.

(21) Appl. No.: 15/709,915

(22) Filed: Sep. 20, 2017

(65) Prior Publication Data

US 2018/0083856 A1 Mar. 22, 2018

(30) Foreign Application Priority Data

Sep. 21, 2016 (CN) .......................... 2016 1 0837924

(51) Int. Cl.
*H04L 12/26* (2006.01)
*H04L 12/24* (2006.01)
(Continued)

(52) U.S. Cl.
CPC .............. *H04L 43/10* (2013.01); *H04L 41/12* (2013.01); *H04L 43/0852* (2013.01);
(Continued)

(58) Field of Classification Search
CPC . H04L 43/10; H04L 43/0852; H04L 43/0835; H04L 41/12; H04L 45/02; H04L 45/38; H04L 45/26
(Continued)

(56) References Cited

U.S. PATENT DOCUMENTS 7,779,034 B2 * 8/2010 Pedersen ................ G06F 16/10 707/781
8,131,825 B2 * 3/2012 Nord ...................... G06F 16/10 709/219

(Continued)

FOREIGN PATENT DOCUMENTS

CN 103281252 9/2013
CN 103905276 7/2014

(Continued)

OTHER PUBLICATIONS

Office Action from State Intellectual Property Office (SIPO) of the People's Republic of China in Chinese Patent Application No. 201610837924.6, dated Feb. 28, 2019, together with an English language translation.

*Primary Examiner* — Kristie D Shingles
(74) *Attorney, Agent, or Firm* — Greenblum & Bernstein, P.L.C.

(57) ABSTRACT

Methods of detecting a packet forwarding path, UMC servers and non-transitory machine-readable storage mediums are provided. In one aspect, a UMC server distributes a target packet feature pre-configured by a user to a plurality of forwarding devices managed by the UMC server, wherein the target packet feature is a feature of a target packet; receives respective path information transmitted by forwarding devices within the forwarding devices managed by the UMC server, wherein the respective path information is extracted by the forwarding devices from the target packet determined based on the target packet feature; and obtains a forwarding path corresponding to the target packet based on the path information transmitted by the forwarding devices.

15 Claims, 3 Drawing Sheets

UMC Server

Upstream device A B C D E Downstream device

(51) Int. Cl.
*H04L 12/751* (2013.01)
*H04L 12/721* (2013.01)

(52) U.S. Cl.
CPC .......... *H04L 45/02* (2013.01); *H04L 43/0835* (2013.01); *H04L 45/38* (2013.01)

(58) Field of Classification Search
USPC .......................................................... 709/224
See application file for complete search history.

(56) References Cited

U.S. PATENT DOCUMENTS

| | | | | |
|---|---|---|---|---|
| 8,792,374 | B1 * | 7/2014 | Jain | H04L 45/42 370/252 |
| 9,264,429 | B2 * | 2/2016 | Harris | H04L 63/08 |
| 2007/0244987 | A1 * | 10/2007 | Pedersen | H04L 67/06 709/217 |
| 2011/0154443 | A1 * | 6/2011 | Thakur | G06F 21/41 726/3 |
| 2016/0072700 | A1 | 3/2016 | Yamato et al. | |
| 2016/0072702 | A1 | 3/2016 | Gao et al. | |

FOREIGN PATENT DOCUMENTS

| | | |
|---|---|---|
| CN | 104038418 | 9/2014 |
| CN | 104935514 | 9/2015 |

* cited by examiner

DETECTING PACKET FORWARDING PATH

CROSS REFERENCE TO RELATED APPLICATIONS

This application claims priority to Chinese Patent Application No. 201610837924.6 entitled "Method and Apparatus for Detecting Packet Forwarding Path" filed on Sep. 21, 2016, the entire content of which is incorporated herein by reference.

TECHNICAL FIELD

The present disclosure relates to network communication technology fields, and more particularly to detecting a packet forwarding path.

BACKGROUND

A path tracing process includes quickly acquiring a forwarding path for the packet when a packet is transmitted in a network, quickly positioning a position where the packet is dropped and acquiring transmission delays for the packet according to the forwarding path for the packet.

SUMMARY

In view of above, methods of detecting a packet forwarding path, UMC servers and machine-readable storage mediums are provided according to examples of the present disclosure.

In the present disclosure, technical solutions can be implemented as follows.

A method of detecting a packet forwarding path includes:

distributing, by a Unified Management Center (UMC) server, a target packet feature pre-configured by a user to a plurality of forwarding devices managed by the UMC server, wherein the target packet feature is a feature of a target packet;

receiving, by the UMC server, respective path information transmitted by forwarding devices within the forwarding devices managed by the UMC server, wherein the respective path information is extracted by the forwarding devices from the target packet determined based on the target packet feature;

obtaining, by the UMC server, a forwarding path corresponding to the target packet based on the path information transmitted by the forwarding devices.

A Unified Management Center (UMC) server, comprising:

a processor, and a non-transitory machine-readable storage medium storing machine executable instructions which are executable by the processor to:

distribute a target packet feature pre-configured by a user to a plurality of forwarding devices managed by the UMC server, wherein the target packet feature is a feature of a target packet;

receive respective path information transmitted by forwarding devices within the forwarding devices managed by the UMC server, wherein the respective path information is extracted by the forwarding devices from the target packet determined based on the target packet feature;

obtain a forwarding path corresponding to the target packet based on the path information transmitted by the forwarding devices.

A non-transitory machine-readable storage medium storing machine executable instructions which are invoked and executed by a processor of a network device to:

distribute a target packet feature pre-configured by a user to a plurality of forwarding devices managed by the UMC server, wherein the target packet feature is a feature of a target packet;

receive respective path information transmitted by forwarding devices within the forwarding devices managed by the UMC server, wherein the respective path information is extracted by the forwarding devices from the target packet determined based on the target packet feature;

obtain a forwarding path corresponding to the target packet based on the path information transmitted by the forwarding devices.

It can be seen from above that, the UMC server distributes a target packet feature pre-configured by a user to a plurality of forwarding devices managed by the UMC server, wherein the target packet feature is a feature of a target packet, receives respective path information transmitted by forwarding devices within the forwarding devices managed by the UMC server, wherein the respective path information is extracted by the forwarding devices from the target packet determined based on the target packet feature; and obtains a forwarding path corresponding to the target packet based on the path information transmitted by the forwarding devices.

The forwarding path is obtained by performing statistic calculation based on the path information extracted by the forwarding devices from the target packet determined based on the target packet feature, thus, a complete forwarding path of the target packet can be acquired.

DETAILED DESCRIPTION

Figure 1:
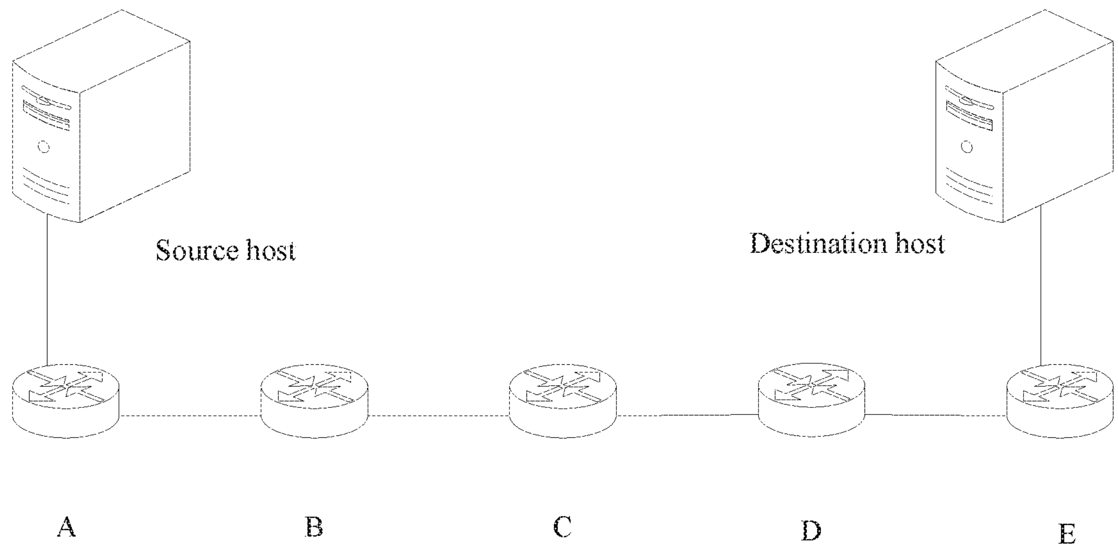
FIG. 1 is a schematic diagram illustrating a scenario for a method of detecting a packet forwarding path through TRACERT according to an example of the present disclosure.

Example embodiments will be described in detail herein with the examples thereof expressed in the drawings. When the following descriptions involve the drawings, like numerals in different drawings represent like or similar elements unless stated otherwise. The implementations described in the following example embodiments do not represent all implementations consistent with the present disclosure. On the contrary, they are merely examples of a device and a method consistent with some aspects of the present disclosure described in detail in the appended claims.

The terminology used in the present disclosure is for the purpose of describing a particular example only, and is not intended to be limiting of the present disclosure. The singular forms such as "a", "said", and "the" used in the present disclosure and the appended claims are also intended to include multiple, unless the context clearly indicates otherwise. It is also to be understood that the term "and/or" as used herein refers to any or all possible combinations that include one or more associated listed items.

It is to be understood that although different information may be described using the terms such as first, second, third, etc. in the present disclosure, these information should not be limited to these terms. These terms are used only to distinguish the same type of information from each other. For example, the first information may also be referred to as the second information without departing from the scope of the present disclosure, and similarly, the second information may also be referred to as the first information. Depending on the context, the word "if" as used herein may be interpreted as "when" or "as" or "determining in response to".

As rapidly developing network technologies, network scale is increasingly expanded, and network complexity is increasingly increased. To improve service quality of a whole network and improve path tracing accuracy, completeness for an obtained packet forwarding path becomes important.

A packet forwarding path can be detected by using a Time To Live (TTL) expiring mechanism in TRACERT. For example, when a device needs to forward a packet and finds that a TTL in the packet expires, the device may send a time exceeded message to a source address. Thus, a forwarding path for the packet can be detected hop by hop by constructing a packet including an accumulated TTL.

FIG. 1 is a schematic diagram illustrating a scenario for a method of detecting a packet forwarding path through TRACERT according to an example of the present disclosure.

In FIG. 1, a source host and a destination host are connected through five forwarding devices A, B, C, D and E. And it is assumed that each of the five forwarding devices is allowed to transmit a TTL expiring packet.

Referring to FIG. 1, it is further assumed that a source host transmits a data packet to a destination host by performing layer-3 forwarding among the forwarding devices. To ensure data security, the source host may firstly acquire a forwarding path for the packet and then transmit the data packet. For example, the source host detects the packet forwarding path through a TTL expiration mechanism. A detail detecting process is described below.

In step 1, the source host constructs an Internet Control Message Protocol (ICMP) request packet, and transmits the packet. Then execute step 3. A destination IP address of the ICMP request packet is an IP address of the destination host to be detected, and an initial TTL value of the ICMP request packet is 1.

In step 2, whether the TTL value reaches a preset threshold is determined. If yes, detection failure is indicated, an obtained part of the path is outputted, and the process ends. Otherwise, the source host accumulates 1 to the TTL value in the ICMP request packet, and retransmits the ICMP request packet. Then execute step 3.

In step 3, when receiving a response packet from the destination host, the source host outputs an obtained packet forwarding path, and the process ends. Otherwise, execute step 4.

In step 4, when receiving a TTL expiring packet transmitted by an intermediate forwarding device, the source host records the path. Alternatively, when the source host does not receive any packet within a set time period, it is indicated that the forwarding path detection by using TTL fails. Then execute step 2.

However, when a packet forwarding path is detected according to the method above and a complete packet forwarding path is required, each forwarding device needs to be allowed to transmit the TTL expiring packet. However, considering data security, a plurality of forwarding devices cannot be allowed to transmit the TTL expired packet, thus, the complete packet forwarding path may not be acquired.

Since a TTL field in an IP header is used in the method above and a value of the TTL field may be decreased only when layer-3 forwarding is performed, that is, the TTL field can only be used for detecting a layer-3 forwarding path.

The TTL expiring packet is transmitted on the control plane of a device according to the method above. A data packet is actually forwarded on a data plane. There is a time difference between the control plane and the user plane. Thus, accurate time delays for forwarding a packet among the forwarding devices cannot be acquired.

Further, according to the method above, a whole network topology is not obtained before detecting the forwarding path, and a next forwarding action for the packet (an exit, a next hop address, an MAC address, etc.) cannot be provided when the TTL expiring packet is transmitted. Thus, the obtained forwarding path is merely pieces of forwarding path information, and continuity of the detected forwarding path cannot be ensured.

The present disclosure provides a method of detecting a packet forwarding path, which applies to a Unified Management Center (UMC) server. In an example, the UMC server distributes a target packet feature pre-configured by a user to a plurality of forwarding devices managed by the UMC server, wherein the target packet feature is a feature of a target packet, receives respective path information transmitted by forwarding devices within the forwarding devices managed by the UMC server, wherein the respective path information is extracted by the forwarding devices from the target packet determined based on the target packet feature; and obtains a forwarding path corresponding to the target packet based on the path information transmitted by the forwarding devices.

Figure 2:
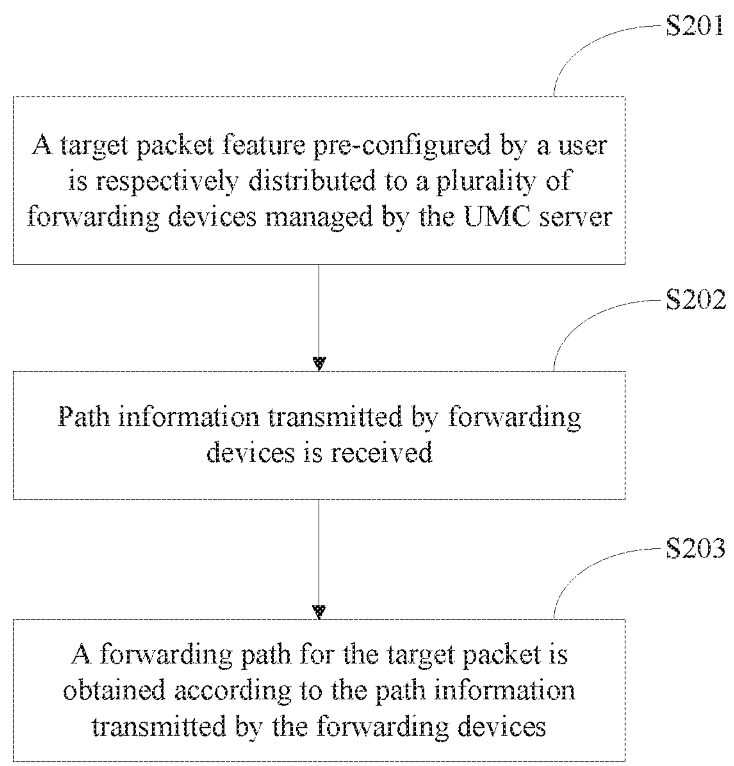
FIG. 2 is a flowchart illustrating a method of detecting a packet forwarding path according to an example of the present disclosure.

FIG. 2 is a flowchart illustrating a method of detecting a packet forwarding path according to an example of the present disclosure, which applies to a UMC server. The method includes procedures as follows.

At block 201, a target packet feature pre-configured by a user is respectively distributed to a plurality of forwarding devices managed by the UMC server.

The target packet feature is a feature of a target packet.

At block 202, path information transmitted by forwarding devices is received.

The forwarding devices respectively transmitting the path information is within the forwarding devices managed by the UMC server. The path information is extracted by the forwarding devices from the target packet determined based on the target packet feature, and is used to determine a forwarding path of the target packet.

At block 203, a forwarding path for the target packet is obtained according to the path information transmitted by the forwarding devices.

The above-mentioned UMC server distributes the packet feature to the forwarding devices managed by the UMC server, receive path information transmitted by forwarding devices, and obtain a forwarding path of the packet according to the path information. After obtaining the forwarding path of the packet, the UMC server may calculate time delays for receiving the target packet by the forwarding devices based on the forwarding path of the packet and respective times when the packet is received by the forwarding devices on the forwarding path.

The above-mentioned target packet feature is a feature of the target packet for which the forwarding path needs to be detected, and is configured by a user. In an example, the above-mentioned target packet may be a layer 2 packet or a layer 3 packet, thus, the target packet feature may be a layer 2 packet feature or a layer 3 packet feature. For example, the above-mentioned target packet may be information such as a source MAC and a destination MAC in a layer 2 packet, or may be information such as a five-tuple in an IP packet which is a layer 3 packet. Further, except the layer 2 packet feature and the layer 3 packet feature described above, the target packet feature may be another feature of a packet, different packets can be distinguished based on the another packet feature accordingly.

A forwarding device receives the packet feature which is pre-configured by the user and is transmitted from the UMC server, may upload the packet feature to a CPU on the forwarding device, and may further dynamically add a Access Control List (ACL) rule, where an action corresponding to the rule includes copying the target packet with a same packet feature and uploading the copied target packet to the CPU. After receiving the copied target packet, the CPU may extract path information from the copied target packet. The path information may include information such as an identifier of the forwarding device, a feature value of the received packet (including key fields such as ipid, checksum and TTL in an IP packet), a time when the packet is received, a packet incoming interface and an outgoing interface. Finally, the forwarding device may package the extracted path information and transmit the packaged path information to the UMC server in a way that the path information can be further processed by the UMC server.

Methods in examples of the present disclosure is described in detail in combination with five phases, i.e., whole network topology generation, clock synchronization, target packet feature distribution, packet uploading, and path calculation.

1) Topology Generation

The UMC server may pre-generate a whole network topology. For example, the UMC server may collect network topology information from a plurality of the forwarding devices and generate a corresponding network topology based on the collected network topology information, so as to ensure accuracy and completeness of a packet forwarding path outputted subsequently.

In an example, the UMC server may generate the network topology by using a standard SNMP or a custom protocol. The network topology information is collected by the UMC server from the forwarding devices, which includes information such as interfaces for the forwarding devices and IP addresses for the forwarding devices.

2) Clock Synchronization

To obtain the forwarding path of the target packet and obtain time delays for receiving the target packet by various forwarding devices on the forwarding path, respective clocks on the forwarding devices are synchronized.

3) Target Packet Feature Distribution

After the forwarding devices complete the clock synchronization, the UMC server may distribute the target packet feature. The target packet feature may be pre-configured by a user. The forwarding devices can perform matching with a target packet based on the target packet feature. And respective CPUs on the forwarding devices may extract path information from the target packet.

To acquire a complete forwarding path for the target packet with the target packet feature, the UMC server may notify the target packet feature to all forwarding devices managed by the UMC server.

The UMC server may distribute the target packet feature to the forwarding devices in some manners, so as to ensure that all the forwarding devices can receive the target packet feature. For example, when the forwarding devices are within a same network segment, the UMC server may distribute the target packet feature to the forwarding devices through broadcast. For another example, when the forwarding devices are not within a same network segment, the UMC server may respectively distribute the target packet feature to the forwarding devices through multicast.

4) Packet Uploading

After receiving the target packet feature distributed by the UMC server, each forwarding device may perform packet matching based on the target packet feature. When obtaining the target packet, the forwarding device extracts the path information associated with the target packet from the target packet, and transmits the path information to the UMC server, so that the UMC server can acquire the forwarding path of the target packet based on the path information.

In an example, after receiving the target packet feature distributed by the UMC server, each forwarding device may upload the target packet feature to a CPU, and may dynamically add an ACL rule, where an action corresponding to the rule includes copying a packet successfully matched with the ACL rule and uploading a copied packet to the CPU. After the ACL rule is added, the forwarding devices may perform matching for a packet to be forwarded. When the match succeeds, it is indicated that the packet is the target packet, and the forwarding device may perform the action corresponding to the ACL rule. i.e., copying the target packet and uploading the copied target packet to the CPU. Further, the forwarding devices may normally forward the target packet in a way that a normal service operation is not impacted.

After receiving the target packet copied and uploaded, the CPU may extract the path information associated with the target packet from target packet copied and uploaded based on the target packet feature. The path information may include information such as an identifier of the forwarding device, a feature value of the received target packet, a time when the packet is received, a packet incoming interface and an outgoing interface.

In an example, the feature value of the above-mentioned target packet may include a value for a key field in the IP header. For example, the feature value of the above-mentioned target packet may include values of key fields in the IP header such as an ipid, a checksum and a TTL.

After extracting the path information, the CPU may package the path information and transmit the packaged path information to the UMC server. The UMC server acquires the forwarding path for the target packet through calculation according to the path information transmitted by the forwarding devices.

5) Path Calculation

After receiving the path information transmitted by the forwarding devices, the UMC server may obtain a forwarding path of the target packet according to the path information.

In an example, after receiving the path information transmitted by the forwarding devices, the UMC server may extract respective TTL values, respective device identifiers and respective packet receiving times from the path information.

In an example, when layer 3 forwarding is performed among forwarding devices managed by the UMC server, a TTL value may be decreased after layer 3 forwarding processing is performed on a forwarding device. Thus, the UMC server may sort the path information transmitted by the forwarding devices in a descending order of the TTL values, may sequentially extract respective device identifiers from the sorted path information, and may obtain the forwarding path for the target packet according to the sequentially-extracted device identifiers.

In the manner above, a complete layer 3 forwarding path may be acquired by sorting the TTL values based on the feature that the TTL value may be gradually decreased during the layer 3 forwarding process.

In an example, when layer 2 forwarding is performed among various forwarding devices managed by the UMC server, the value for the TTL field in the packet is not changed. In this case, the UMC server may sort the path information transmitted by the forwarding devices in an ascending order of packet receiving times when the target packet is respectively received by the forwarding device, may sequentially extract respective device identifiers from the sorted path information, and obtain the forwarding path for the target packet according to the sequentially-extracted device identifiers.

In the manner above, a complete layer 2 forwarding path may be obtained by sorting packet receiving times based on the feature that the packet receiving times may be gradually increased during the layer 2 forwarding process.

Further, except the two cases above, there is a mixed case including the two cases above, i.e., both layer 3 forwarding and layer 2 forwarding are performed for a packet among various forwarding devices above. In an example of this case, the UMC server may firstly sort the path information according to the TTL values in the target packet as described in the layer 3 forwarding case. And the UMC server further sort the path information associated with a same TTL value in an ascending order of respective packet receiving times corresponding to the path information as described in the layer 2 forwarding case. Thus, a complete packet forwarding path can be obtained. In another example, the respective path information transmitted by a plurality of forwarding devices may be sorted directly in an ascending order of packet receiving times, and the respective device identifiers are sequentially extracted from the sorted path information, so that the complete packet forwarding path can be obtained.

In the method examples above, the forwarding path is obtained according to the path information from various forwarding devices on the forwarding path, where the path information is extracted from a target packet obtained based on the target packet feature. Thus, the complete forwarding path for the target packet can be obtained.

Further, when detecting the forwarding path based on the path information, the UMC server may obtain layer 2 and layer 3 forwarding paths by sorting the TTL values and packet receiving times included in the path information, so as to implement the forwarding path detection in layer 2 and layer 3 hybrid networks.

Further, when the UMC server detects the forwarding path based on the path information, accurate time delays for receiving the packet by various forwarding devices may be calculated through packet receiving times in the path information because the path information is extracted by various forwarding devices on a data plane.

Further, before detecting the forwarding path based on the path information, the UMC server collects whole network topology information and generates the corresponding whole network topology. And the forwarding path is detected based on the generated whole network topology. Thus, continuity of the detected forwarding path can be ensured.

Packet forwarding path calculation in a specific scenario is taken as an example.

Figure 3:
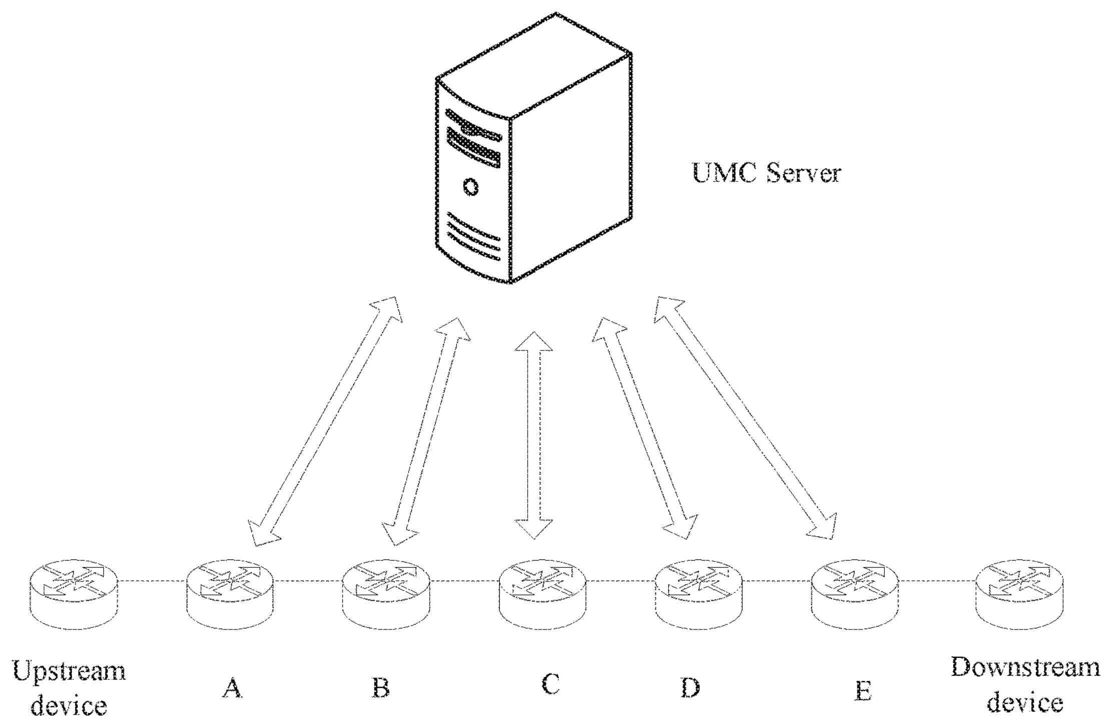
FIG. 3 is a schematic diagram illustrating a scenario for a method of detecting a packet forwarding path according to an example of the present disclosure.

FIG. 3 is schematic diagram illustrating a scenario for a method of detecting a packet forwarding path according to an example of the present disclosure. It is assumed that a target packet sequentially passes through five forwarding devices with respective device identifiers A, B, C, D and E. During the target packet forwarding process, the UMC server receives respective path information from the five forwarding devices with the respective identifiers A, B, C, D and E. In an example, TTL values, device identifiers and packet receiving times extracted from the path information are as shown in Table 1.

TABLE 1

| Device Identifier | TTL | Packet Receiving Time |
|---|---|---|
| A | 10 | $T_a$ |
| B | 9 | $T_b$ |
| C | 8 | $T_c$ |
| D | 7 | $T_d$ |
| E | 6 | $T_e$ |

The packet receiving times in the table satisfies $T_a<T_b<T_c<T_d<T_e$.

It can be determined that only layer 3 forwarding is performed for the packet among the five forwarding devices because the TTL values for various forwarding devices in the table differ from each other.

It can be seen in the table, the respective TTL values for the above-mentioned five forwarding devices are 10, 9, 8, 7 and 6. Thus, a sorting result for the path information transmitted by the forwarding devices in a descending order of the TTL values is: (A, 10, $T_a$) ⇢ (B, 9, $T_b$) ⇢ (C, 8, $T_c$) ⇢ (D, 7, $T_d$) ⇢ (E, 6, $T_e$). Then, the device identifiers in the sorted path information are sequentially extracted, and the forwarding path for the target packet can be obtained according to the sequentially-extracted device identifiers, i.e., a forwarding path A→B→C→D→E. It can be seen that the forwarding path obtained according to the method above is a complete packet forwarding path.

In another example, the TTL values, the device identifiers and the packet receiving times extracted by the UMC server from the path information are as shown in Table 2.

TABLE 2

| Device Identifier | TTL | Packet Receiving Time |
|---|---|---|
| A | 10 | $T_a$ |
| B | 10 | $T_b$ |
| C | 10 | $T_c$ |
| D | 10 | $T_d$ |
| E | 10 | $T_e$ |

The packet receiving time in the table satisfies $T_a<T_b<T_c<T_d<T_e$.

It can be seen from the table that, packet receiving times for the above-mentioned five forwarding devices are $T_a$, $T_b$, $T_c$, $T_d$, $T_e$, where $T_a<T_b<T_c<T_d<T_e$. Thus, a sorting result for the path information transmitted by the forwarding devices in an ascending order of the packet receiving times is: (A, 10, $T_a$)→(B, 10, $T_b$)→(C, 10, $T_c$)→(D, 10, $T_d$)→(E, 10, $T_e$). Then, the forwarding path for the target packet is obtained by sequentially extracting the device identifiers in the sorted path information, i.e., a forwarding path A→B→C→D→E, where the obtained forwarding path is a complete packet forwarding path.

In an example, after obtaining the complete forwarding path for the target packet, the UMC server may calculate time delays for receiving the target packet by various forwarding devices according to the packet receiving times. Since both a process of receiving the packet and a process of determining the packet receiving time are performed on the data plane, there is no time difference between the two processes. Thus, the packet time delays can be accurately obtained. For implementation, after obtaining the forwarding path of the target packet through calculation, the UMC server extracts packet receiving times of the forwarding devices, obtains a difference of packet receiving times between any two adjacent forwarding devices. Thus, a time delay for receiving the target packet by any two adjacent forwarding devices is obtained.

Herein, the time delay calculation for the received packet in the specific scenario shown in FIG. 3 is taken as an example.

Referring to the forwarding devices with the respective device identifiers B and C in Table 2, the target packet receiving times for the forwarding devices are $T_b$ and $T_c$. Since the packet is forwarded on the data plane and $T_b$ and $T_c$ are obtained from the data plane, an accurate time delay for receiving the target packet by the forwarding devices with the identifiers are B and C can be obtained according to $T_b$ and $T_c$. That is, the time delay for receiving the target packet is $T_c$-$T_b$.

After calculating a complete forwarding path for the target packet, the UMC server may rapidly locate a packet dropping position (e.g., a particular device or a particular interface) according to the forwarding path, thereby facilitating packet dropping analysis.

For example, after the UMC server has obtained a complete packet forwarding path, the UMC server collects data transmitted from forwarding devices, obtains an incomplete forwarding path, e.g., not obtaining a path after a particular forwarding device, the UMC server may further analyze the packet transmitted from the forwarding device. If the packet indicates that route lookup failure causes that an outgoing interface is null, it can be explicitly determined that the forwarding device causes that the packet is dropped. If the packet transmitted from the forwarding device to the UMC server indicates information such as a particular outgoing interface, a failure reason may be in that the forwarding device fails to transmit the packet or a device connected with the forwarding device fails to receive the packet. Besides, when the packet is actively dropped by an intermediate forwarding device, a dropping reason for the packet may further be provided, e.g., a blackhole route is configured, or the forwarding cannot be correctly performed due to invalid Address Resolution Protocol (ARP).

Herein, location for a packet dropping position in the specific scenario shown in FIG. 3 is taken as an example.

For example, the UMC server has obtained a complete packet forwarding path A→B→C→D→E. When the data transmitted from different forwarding devices is collected and a forwarding path A→B→C is obtained, the UMC server may further analyze a packet transmitted from the forwarding device C. If the packet indicates that the route lookup failure causes that an egress is null, it can be explicitly determined that the forwarding device C causes that the packet is dropped. If the packet transmitted from the forwarding device C to the UMC server indicates information such as a particular outgoing interface, the failure reason may be in that the forwarding device C fails to transmit the packet or the forwarding device D fails to receive the packet.

As can be seen from the above technical solutions provided in the present disclosure, the UMC server distributes a target packet feature pre-configured by a user to a plurality of forwarding devices managed by the UMC server, wherein the target packet feature is a feature of a target packet, receives respective path information transmitted by forwarding devices within the forwarding devices managed by the UMC server, wherein the respective path information is extracted by the forwarding devices from the target packet determined based on the target packet feature; and obtains a forwarding path corresponding to the target packet based on the path information transmitted by the forwarding devices.

The UMC server distributes a target packet feature pre-configured by a user to a plurality of forwarding devices managed by the UMC server, and receives respective path information transmitted by forwarding devices within the forwarding devices managed by the UMC server, wherein the respective path information is extracted by the forwarding devices from the target packet determined based on the target packet feature. Thus, complete path information for the target packet can be acquired. Finally, a forwarding path corresponding to the target packet is obtained based on the path information transmitted by the forwarding devices.

Methods according to the present disclosure are described above. Devices according to the present disclosure are described below.

Figure 4:
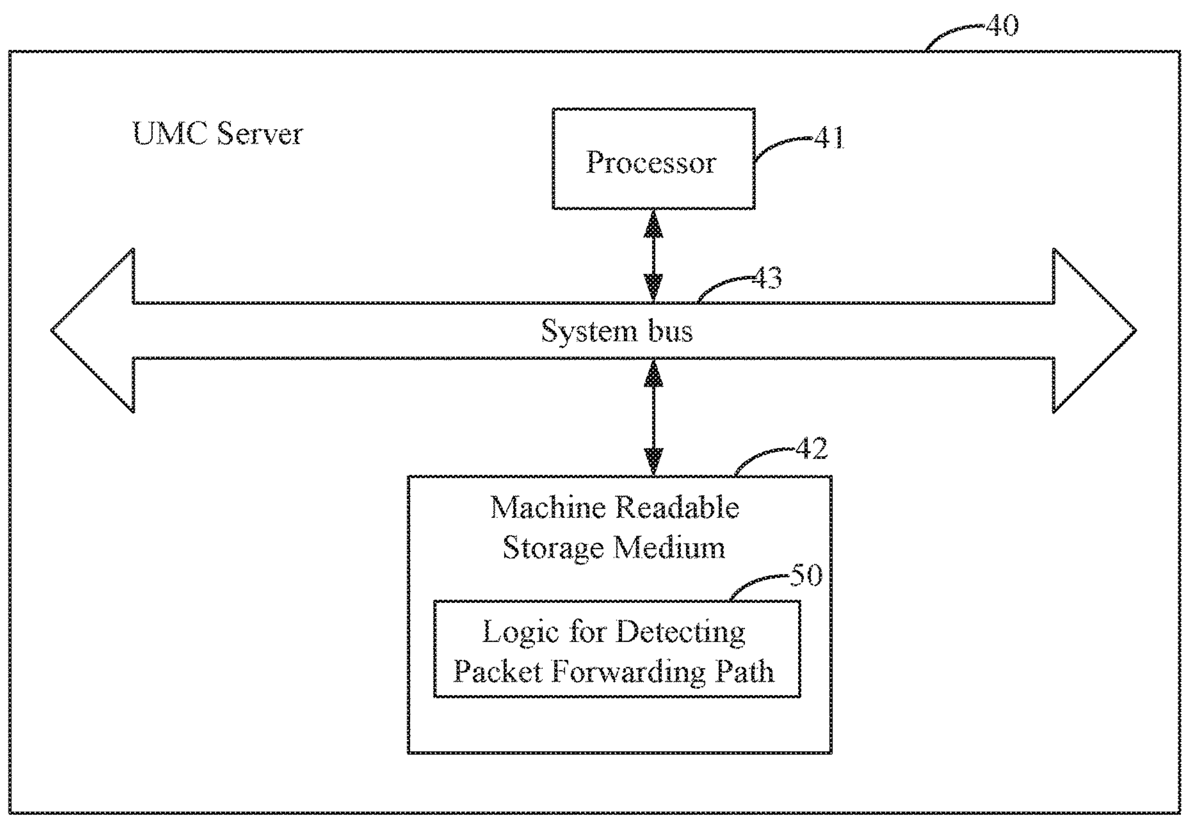
FIG. 4 is a schematic diagram illustrating a hardware structure of a UMC server according to an example of the present disclosure.

FIG. 4 schematically illustrates a hardware structure diagram of a UMC server, which is provided by an example of the present disclosure. The UMC server 40 may include a processor 41 and a machine-readable storage medium 42 storing machine executable instructions. The processor 41 may communicate with the machine-readable storage medium 42 via a system bus 43, and execute the method of interworking between an EVPN and a public network described above by reading and executing the machine executable instructions corresponding to a packet forwarding path detecting logic 50 in the machine-readable storage medium 42. The processor 41 can execute the method of detecting a packet forwarding path as described above.

As used herein, the machine-readable storage medium 42 may be any electronic, magnetic, optical, or other physical storage apparatus to contain or store information such as executable instructions, data, and the like. For example, any machine-readable storage medium 42 described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof.

Figure 5:
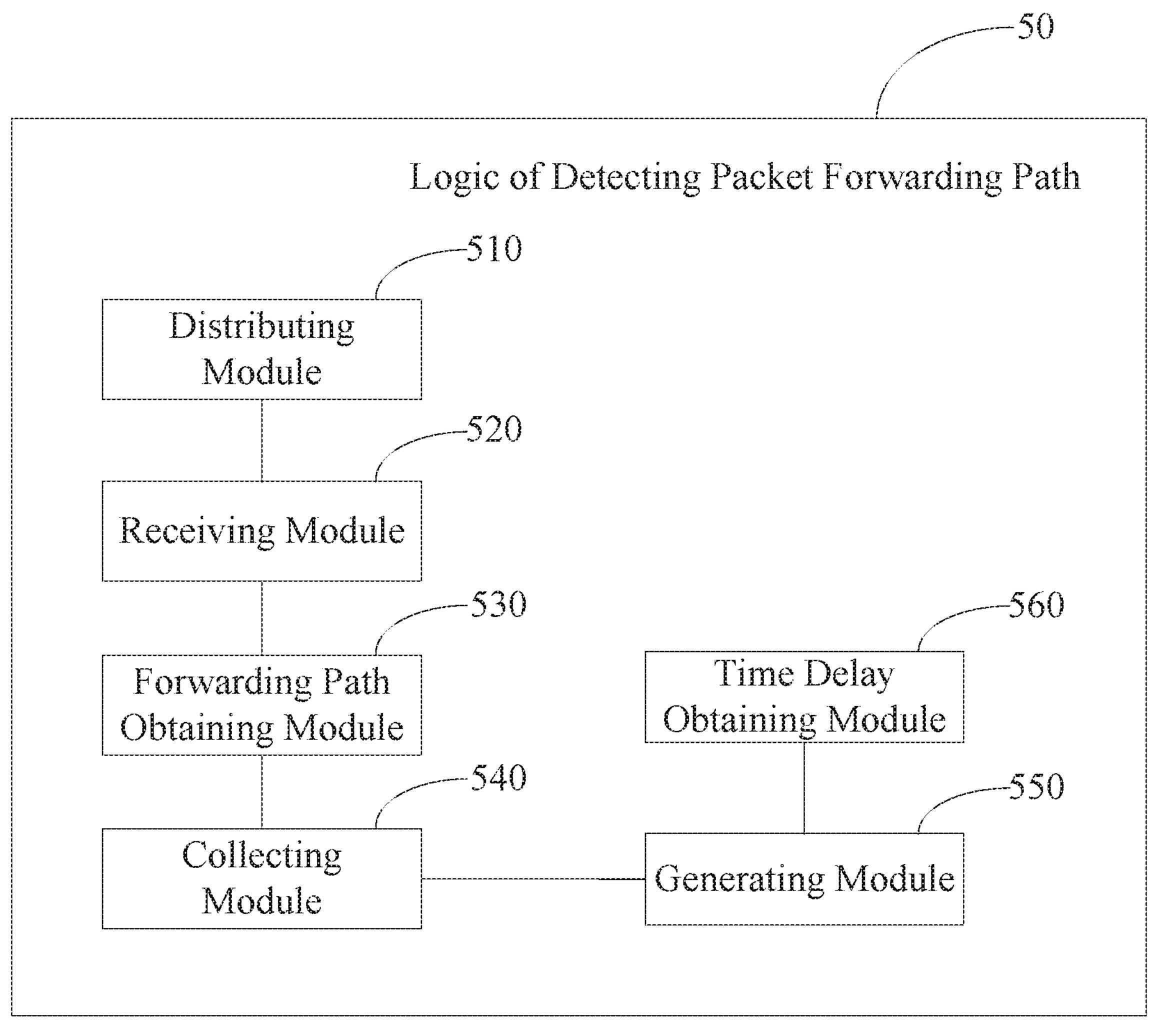
FIG. 5 is a schematic diagram illustrating a structure of logic for detecting a packet forwarding path according to an example of the present disclosure.

As shown in FIG. 5, functionally divided, the logic 50 for detecting a forwarding path above may include a distributing module 510, a receiving module 520, and a forwarding path obtaining module 530 as follows.

The distributing module 510 is configured distribute a target packet feature pre-configured by a user to a plurality of forwarding devices managed by the UMC server, wherein the target packet feature is a feature of a target packet.

The receiving module 520 is configured to receive respective path information transmitted by forwarding devices within the forwarding devices managed by the UMC server, wherein the respective path information is extracted by the forwarding devices from the target packet determined based on the target packet feature.

The forwarding path obtaining module 530 is configured to obtain a forwarding path corresponding to the target packet based on the path information transmitted by the forwarding devices.

In an example, the logic for detecting a packet forwarding path 60 further includes a collecting module 540 and a generating module 550.

The collecting module 540 is configured to collect network topology information from the forwarding devices managed by the UMC server.

The generating module 550 is configured to generate a corresponding network topology based on the collected network topology information.

In an example, the logic for detecting a packet forwarding path 60 further includes a time delay obtaining module 560.

The time delay obtaining module 560 is configured to obtain a time delay for receiving the target packet between two adjacent forwarding devices on the forwarding path by performing calculation according to packet receiving times in path information transmitted by the two adjacent forwarding devices.

In an example, the path information comprises respective device identifiers of the forwarding devices and respective Time To Live (TTL) values extracted by the forwarding devices from the target packet.

The forwarding path obtaining module 530 is configured to sort the path information in a descending order of the TTL values in the path information; sequentially extract the device identifiers from the sorted path information; obtain the forwarding path of the target packet according to the sequentially-extracted device identifiers.

In an example, the path information comprises respective device identifiers of the forwarding devices and packet receiving times for the target packet sequentially received by the forwarding devices:

The forwarding path obtaining module 530 is configured to sort the path information in an ascending order of the packet receiving times for the target packet in the path information; sequentially extract the device identifiers from the sorted path information; and obtain the forwarding path of the target packet according to the sequentially-extracted device identifiers.

Details of the implementation process of the functions and effects of different units in the above-described device may be seen in the implementation process of corresponding blocks in the above-described method, which will not be redundantly described herein.

Since the device embodiments substantially correspond to the method embodiments, a reference may be made to part of the descriptions of the method embodiments for the related part. The device embodiments described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the embodiments. Those of ordinary skill in the art may understand and carry out them without creative work.

The above are merely descriptions of the preferred embodiments of the present disclosure, which are not intended to limit the present disclosure. Any modifications, equivalent substitutions, improvements and the like made within the sprit and principles of the present disclosure shall all be encompassed in the scope of protection of the present disclosure.

The invention claimed is:

1. A method of detecting a packet forwarding path, comprising:

distributing, by a Unified Management Center (UMC) server, a target packet feature pre-configured by a user to a plurality of forwarding devices managed by the UMC server, wherein the target packet feature is a feature of a target packet for which a forwarding path is to be obtained, and wherein clocks on the plurality of forwarding devices are synchronized before the target packet feature is distributed;

receiving, by the UMC server, respective path information transmitted by forwarding devices within the plurality of forwarding devices managed by the UMC server, wherein the respective path information is extracted by the forwarding devices from the target packet determined based on the target packet feature, and wherein the respective path information includes respective times when the target packet feature is received by the plurality of forwarding devices;

obtaining, by the UMC server, the forwarding path corresponding to the target packet based on the path information transmitted by the forwarding devices; and calculating, by the UMC server, time delays for receiving the target packet by the plurality of forwarding devices based on the forwarding path and the respective times.

2. The method according to claim 1, the method further comprising:

collecting, by the UMC server, network topology information from the plurality of forwarding devices managed by the UMC server;

generating, by the UMC server, a corresponding network topology based on the collected network topology information.

3. The method according to claim 1, wherein the path information comprises respective device identifiers of the forwarding devices and respective Time To Live (TTL) values extracted by the forwarding devices from the target packet, and the process of obtaining the forwarding path of the target packet according to the path information transmitted by the forwarding devices comprises:

sorting, by the UMC server, the path information in a descending order of the TTL values in the path information;

sequentially extracting, by the UMC server, the device identifiers from the sorted path information; and obtaining, by the UMC server, the forwarding path of the target packet according to the sequentially-extracted device identifiers.

4. The method according to claim 1, wherein the path information comprises respective device identifiers of the forwarding devices and packet receiving times for the target packet sequentially received by the forwarding devices, and the process of obtaining the forwarding path of the target packet according to the path information transmitted by the forwarding devices comprises:

sorting, by the UMC server, the path information in an ascending order of the packet receiving times for the target packet in the path information;

sequentially extracting, by the UMC server, the device identifiers from the sorted path information; and obtaining, by the UMC server, the forwarding path of the target packet according to the sequentially-extracted device identifiers.

5. The method according to claim 4, further comprising:

obtaining, by the UMC server, a time delay for receiving the target packet between two adjacent forwarding devices on the forwarding path by performing calculation according to packet receiving times in path information transmitted by the two adjacent forwarding devices.

6. A Unified Management Center (UMC) server, comprising:

a processor, and a non-transitory machine-readable storage medium storing machine-executable instructions which are executable by the processor to:

distribute a target packet feature pre-configured by a user to a plurality of forwarding devices managed by the UMC server, wherein the target packet feature is a feature of a target packet for which a forwarding path is to be obtained, and wherein clocks on the forwarding devices are synchronized before the target packet feature is distributed;

receive respective path information transmitted by forwarding devices within the plurality of forwarding devices managed by the UMC server, wherein the respective path information is extracted by the forwarding devices from the target packet determined based on the target packet feature, and wherein the respective path information includes respective times when the target packet feature is received by the forwarding devices;

obtain the forwarding path corresponding to the target packet based on the path information transmitted by the forwarding devices; and calculate time delays for receiving the target packet by the forwarding devices based on the forwarding path and the respective times.

7. The server according to claim 6, wherein the processor is further caused by the machine-executable instructions to:

collect network topology information from the plurality of forwarding devices managed by the UMC server; and generate a corresponding network topology based on the collected network topology information.

8. The server according to claim 6, wherein the path information comprises respective device identifiers of the forwarding devices and respective Time To Live (TTL) values extracted by the forwarding devices from the target packet, and the processor is further caused by the machine-executable instructions to:

sort the path information in a descending order of the TTL values in the path information;

sequentially extract the device identifiers from the sorted path information; and obtain the forwarding path of the target packet according to the sequentially-extracted device identifiers.

9. The server according to claim 6, wherein the path information comprises respective device identifiers of the forwarding devices and packet receiving times for the target packet sequentially received by the forwarding devices, and the processor is further caused by the machine-executable instructions to:

sort the path information in an ascending order of the packet receiving times for the target packet in the path information;

sequentially extract the device identifiers from the sorted path information; and obtain the forwarding path of the target packet according to the sequentially-extracted device identifiers.

10. The server according to claim 6, wherein the processor is further caused by the machine-executable instructions to:

obtain a time delay for receiving the target packet between two adjacent forwarding devices on the forwarding path by performing calculation according to packet receiving times in path information transmitted by the two adjacent forwarding devices.

11. A non-transitory machine-readable storage medium storing machine-executable instructions which are invoked and executed by a processor of a network device to:

distribute a target packet feature pre-configured by a user to a plurality of forwarding devices managed by the UMC server, wherein the target packet feature is a feature of a target packet for which a forwarding path is to be obtained, and wherein clocks on the forwarding devices are synchronized before the target packet feature is distributed;

receive respective path information transmitted by forwarding devices within the plurality of forwarding devices managed by the UMC server, wherein the respective path information is extracted by the forwarding devices from the target packet determined based on the target packet feature, and wherein the respective path information includes respective times when the target packet feature is received by the forwarding devices;

obtain the forwarding path corresponding to the target packet based on the path information transmitted by the forwarding devices; and calculate time delays for receiving the target packet by the forwarding devices based on the forwarding path and the respective times.

12. The storage medium according to claim 11, wherein the machine-executable instructions further cause the processor to:

collect network topology information from the plurality of forwarding devices managed by the UMC server; and generate a corresponding network topology based on the collected network topology information.

13. The storage medium according to claim 11, wherein the path information comprises respective device identifiers of the forwarding devices and respective Time To Live (TTL) values extracted by the forwarding devices from the target packet, and the machine-executable instructions further cause the processor to:

sort the path information in a descending order of the TTL values in the path information;

sequentially extract the device identifiers from the sorted path information; and obtain the forwarding path of the target packet according to the sequentially-extracted device identifiers.

14. The storage medium according to claim 11, wherein the path information comprises respective device identifiers of the forwarding devices and packet receiving times for the target packet sequentially received by the forwarding devices, and the machine-executable instructions further cause the processor to:

sort the path information in an ascending order of the packet receiving times for the target packet in the path information;

sequentially extract the device identifiers from the sorted path information; and obtain the forwarding path of the target packet according to the sequentially-extracted device identifiers.

15. The storage medium according to claim 11, wherein the machine-executable instructions further cause the processor to:

obtain a time delay for receiving the target packet between two adjacent forwarding devices on the forwarding path by performing calculation according to packet receiving times in path information transmitted by the two adjacent forwarding devices.

* * * * *